Dec. 26, 1950     O. R. SHERMAN ET AL     2,535,760
AUTOMATIC SLUDGE DRAIN FOR AIRBRAKE SYSTEMS
Filed June 21, 1947     2 Sheets-Sheet 1
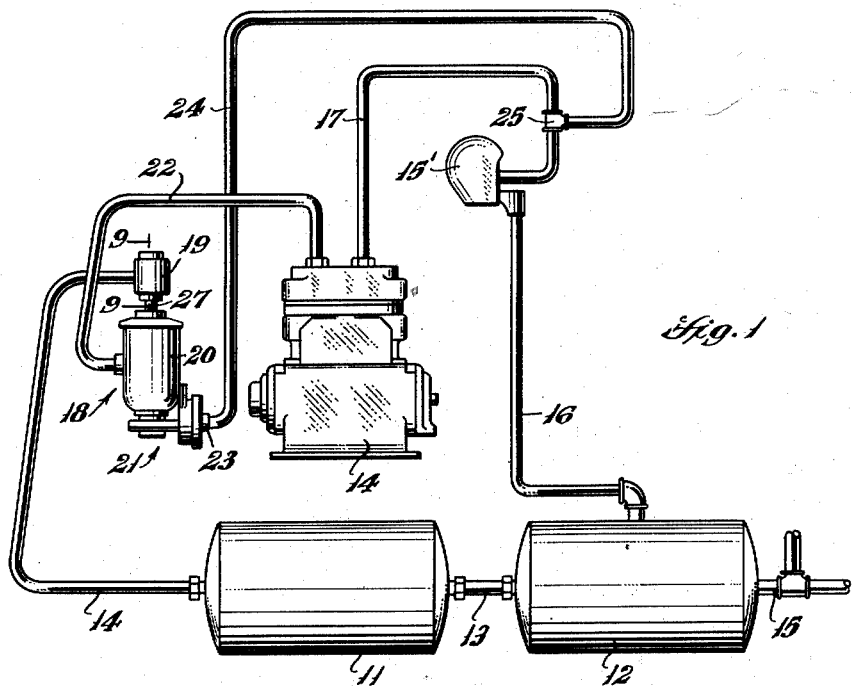
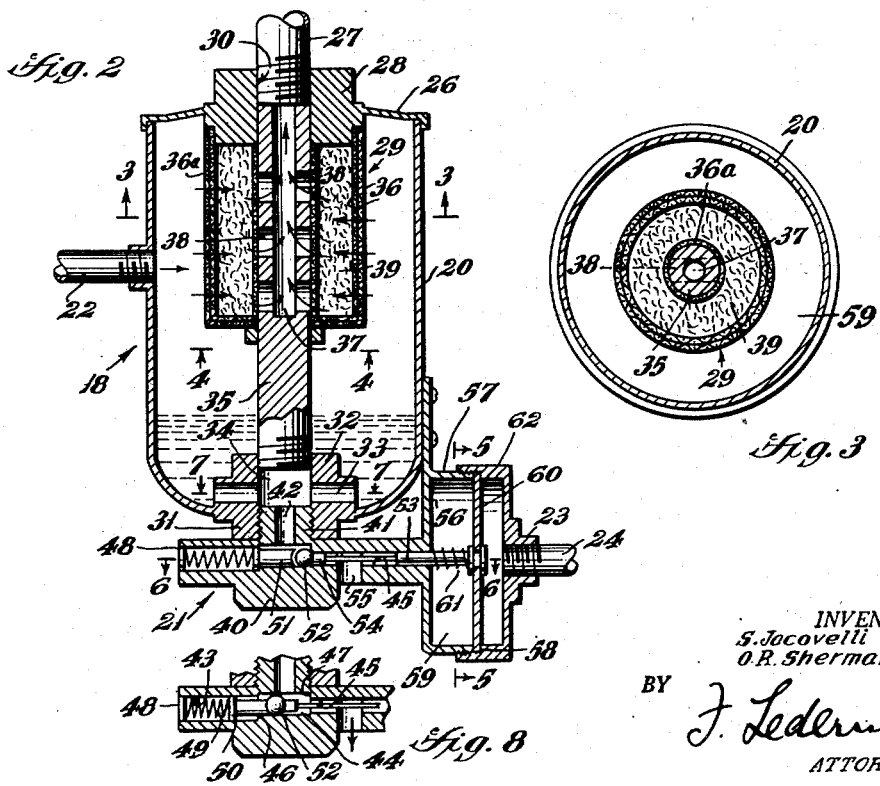
INVENTORS
S. Jocovelli
O. R. Sherman
BY
F. Lederman
ATTORNEY Dec. 26, 1950     O. R. SHERMAN ET AL     2,535,760
AUTOMATIC SLUDGE DRAIN FOR AIRBRAKE SYSTEMS
Filed June 21, 1947     2 Sheets-Sheet 2
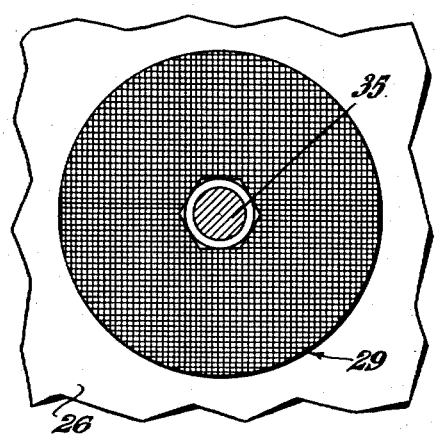
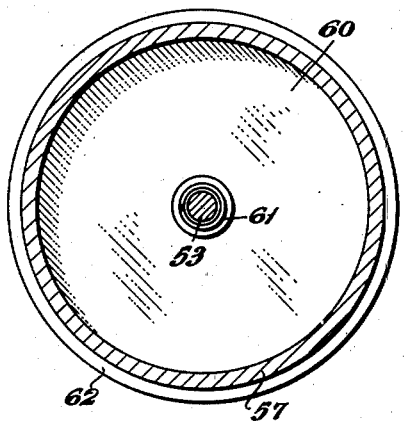
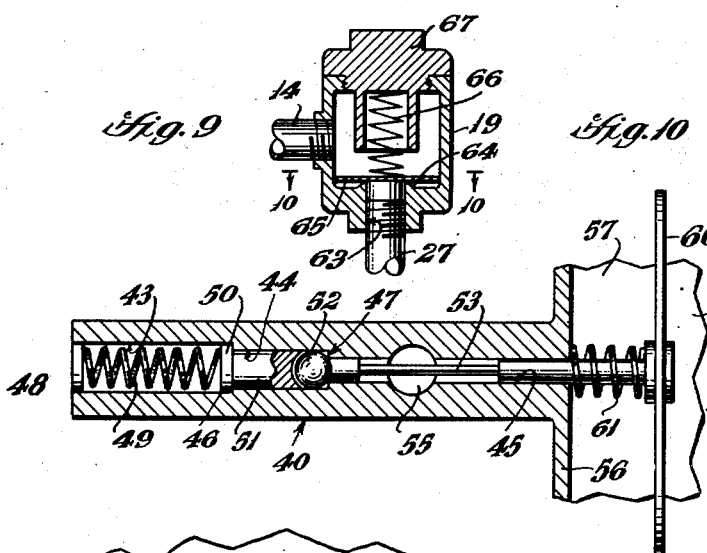
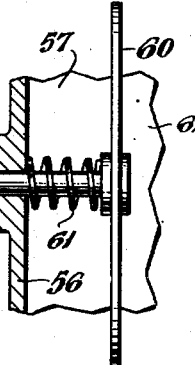
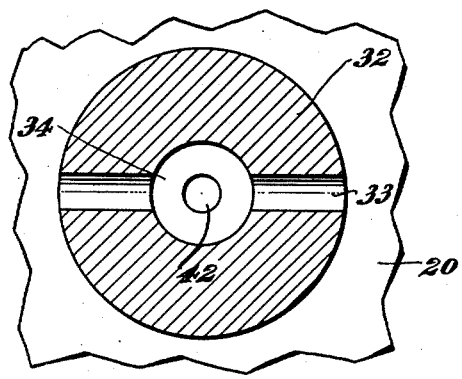
INVENTORS
S. Jacovelli
O. R. Sherman
BY
J. Ledermann
ATTORNEY Patented Dec. 26, 1950

2,535,760

UNITED STATES PATENT OFFICE 2,535,760

AUTOMATIC SLUDGE DRAIN FOR
AIRBRAKE SYSTEMS

Otis R. Sherman, New York, and Samuel
Jacovelli, Brooklyn, N. Y.

Application June 21, 1947, Serial No. 756,184

5 Claims. (Cl. 303—88)

This invention relates to sludge drains for air brake systems of vehicles, and more particularly to those of buses and trucks, and aims primarily to provide automatic and continually operating means for draining the sludge out of the system thereby preventing the accumulation of the sludge to a degree or level at which it reduces the effectiveness or efficiency of the air brake system.

In order to maintain an air brake at minimum cost operating efficiency, the air reservoir must be kept clean of water, oil, carbon, etc., and to maintain a constant volume of air under pressure in the reservoir, the latter must be frequently drained. A reservoir whose chamber is partly filled with water, oil, etc., necessarily has a reduced volume of air available for operating the brakes, so that the power available for brake operation is proportionately reduced.

The compressor takes in atmospheric air which at all times contains a percentage of water, and the percentage is highest on humid or rainy days. It also collects oil and carbon, and the mixture of water, oil, and carbon are delivered into the reservoir. Upon application of the brakes some of this mixture passes through the brake system, where it may saturate the brake chambers, diaphragms, and valves. The carbon also gets under the brake valves to cause air leakage. In freezing weather the water will freeze in the brake system and prevent the air from reaching the brake chambers, thus preventing operation of the brakes.

It is a further object of the invention to provide a member interposed between the compressor outlet and the air reservoir inlet, which is in the form of a housing and contains an air filter through which the compressed air must pass and which further contains a drain valve at the bottom of the housing where the sludge will collect, the drain valve having means normally closing the same and having additional means connected with the usual governor and operated by the pressure variations in the line between the governor and the compressor to open the drain valve frequently and automatically, as explained below, whereby a continually repetitive opening of the drain valve is provided. Hence, the sludge will be drained from the compressed air before it reaches the reservoir, and the filter mentioned above will further clean the compressed air and prevent ice or dust particles from entering the brake system and passing to the brake chambers.

The above as well as additional objects will become apparent in the following description, wherein characters of reference refer to like-numbered parts on the accompanying drawings. It is to be noted that the drawings are intended for the purpose of illustration only, and that it is neither desired nor intended to limit the invention necessarily to any or all of the specific details of construction shown excepting insofar as they may be deemed essential to the invention.

Referring briefly to the drawings, Fig. 1 is a schematic diagram of part of an air brake system, showing those members of the system, and their interconnections, which are essential to an exposition of the instant invention, and showing also the instant invention applied thereto.

Fig. 2 is a central longitudinal cross-sectional elevational view, taken on a plane parallel with the plane of the paper, through the member shown in Fig. 1, which constitutes the essential part of the instant invention.

Fig. 3 is a cross-sectional view taken on the line 3—3 of Fig. 2.

Fig. 4 is a cross-sectional view taken on the line 4—4 of Fig. 2.

Fig. 5 is a cross-sectional view taken on the line 5—5 of Fig. 2.

Fig. 6 is a sectional view taken on the line 6—6 of Fig. 2.

Fig. 7 is a sectional view taken on the line 7—7 of Fig. 2.

Fig. 8 is a fragmentary reproduction of Fig. 2, showing the drain valve in open position.

Fig. 9 is a sectional view taken on the line 9—9 of Fig. 1.

Fig. 10 is a cross-sectional view taken on the line 10—10 of Fig. 9.

Referring in detail to the drawings, the numeral 11 indicates one and the numeral 12 the other of two compressed air reservoirs connected in series by the pipe 13, having the intake pipe 14 and the outlet pipe 15, the latter leading to one or more air brake chambers, not shown. The compressor of the air brake system is shown at 14, and the governor at 15', the former being driven in the standard manner by means which it is believed unnecessary to illustrate or describe. The function of the governor 15' is to limit automatically the air pressure in the reservoirs 11 and 12, by stopping compression when the reservoir pressure has been built up to the maximum pressure limit or by starting compression when the reservoir pressure has dropped below the minimum pressure limit. Two tubing lines or pipes are used to connect the governor in the system; one pipe 16 leading from the reservoir 12 to the lower governor connection, and the other pipe 17 leading from the upper governor connection to the "unloader" port, not shown, of the compressor 14. When the maximum pressure has been built up in the reservoirs, the governor cuts out, delivering air pressure through the unloader line 17 to the unloader port of the compressor and stopping compression. Although it may here be added, that when the reservoir pressure has dropped to the lower limit the governor cuts in, it is only the first-mentioned, or cutting out, operation of the governor upon which the operation of the instant invention depends, during which, as stated, the governor delivers pressure through the line 17.

The instant invention comprises the member 18, which is partly a housing 20 having a drain valve housing 21 mounted at the bottom thereof, and partly a smaller check valve housing 19 connected in series with the housing 20, and the installation of the housing 19 and 20 in series between the line 14 and the compressor output line 22, and in addition the connection of the drain valve housing pressure inlet 23 to a branch line 24 joined by a T 25 in the line 17.

The housing 18 comprises the substantially cylindrical enclosure or housing having a cap 26 having an opening 30 therethrough; a pipe connection 27 connects the housing 19 in series with the housing 20 through the opening in the cap 26. The cap 26 includes the boss 28 surrounding the said opening. A downwardly projecting internally threaded nipple 31 is provided in the center of the bottom of the housing 20, the said bottom being rounded or otherwise shaped to cause fluid in the housing to concentrate at the center. The nipple 31 is part of a body 32 within the housing 20, this body having a transverse passage 33 therethrough. The internal passage through the nipple 31 is in alignment with a vertical passage 34 through the body 32, the upper end of the passage 34 being threaded and having a stem or rod 35 mounted in the upper end of the passage 34 and extending upward into the cap opening 30.

A filter 29, in the shape of a cup having an axial passage therethrough, is secured to and depends from the boss 28. The filter comprises one or more screens 36 superimposed upon each other, and the innermost screen 36a has a cylindrical wall surrounding the said axial passage through the filter and also surrounding the upper portion of the stem 35. The said upper portion of the stem 35 is hollow to provide a passage 37 communicating at its upper extremity with the cap opening 30. A plurality of radial openings 38 through the wall of the said upper portion of the stem provides communication between the filter 29 and the passage 37. The filter 29 is filled with a suitable filtering material such as, for instance, hair, 39.

The drain valve member or assembly 21, comprises the housing 40 having a tit 41 which screws into the nipple 31 and whose internal passage 42 communicates with both passages 33 and 34 of the body 32. The housing 40 is provided with three axially aligned horizontal passages of successively diminishing diameters, 43, 44, and 45, thereby providing a shoulder 46 between the passages 43 and 44, and a shoulder 47 between the passages 44 and 45. A cap 48 closes the free end of the passage 43, and a coiled compression spring 49 is mounted in this passage between the cap 48 and a slidable head 50. A rod 51 is sildably mounted in the passage 44 and is slidable into the passage 43 against the spring 49. The righthand end (Figs. 2 and 8) of the rod 51 is dished out to provide a seat for a loose ball 52 which is freely moveable longitudinally in the passage 44 but which is of greater diameter than the passage 45 and therefore cannot pass the shoulder 47 in moving to the right. A stem 53 is slidably mounted in the passage 45 and its left-hand end is enlarged and in contact with the ball 52, as shown at 54. It is obvious that the spring 49 normally urges the ball 52 against the shoulder 47 and thus normally closes off communication between the passages 44 and 45. A drain opening 55 is provided through the wall of the housing 40 into the passage 45.

A flange 56 is formed or provided on the right-hand end of the housing 40 about the extremity of the passage 45. An annular boss or ring 57 is formed integrally with the flange 56 so as to provide a chamber 59 forward of the flange 56, and the latter is bolted or screwed to the housing 20. A diaphragm 60, made of any suitable yieldable material, is mounted against the rim of the ring 57 and it is axially secured to the tip of the stem 53. A light compression spring 61 surrounds the stem 53 between the diaphragm and the flange 56. A flanged cap 62 threadably engages about the ring 57 and has a shoulder 53 which clamps the diaphragm 60 against the ring 57, and it is further provided with an axial opening surrounded by a nipple inlet 23 to which the pipe 24 is connected.

The check valve housing 19, having an outlet opening into which the pipe 14 is connected and the inlet opening 63 into which the upper end of the pipe 27 connects, has a valve seat 64 on which the valve disc 65 is normally urged to seat, by a compression spring 66 mounted between the valve 65 and the cap 67 of the housing 19. Thus, this check valve is normally closed, and it opens upon excess of pressure in the pipe 27 over that in the pipe 14.

The operation of the device is as follows. As the compressor delivers compressed air through the pipe 22 into the housing 20, the filter 29 will block undesired particles from passing into the pipe 14 and hence into the reservoirs, and water, oil, carbon, etc., will tend to collect at the bottom of the housing. As stated before, when the governor 15' automatically shuts off or cuts out the compressor by applying pressure in the pipe 17, this pressure will also be applied in the branch pipe 24 against the diaphragm 60. Thus the diaphragm will be distorted to the left, Fig. 2, thereby moving the ball 52 away from the shoulder 47, as well as the enlarged end 54 of the stem 53, so that the passage 45 for the distance between the shoulder 47 and the drain outlet 55 will be opened, thereby permitting the accumulated sludge to drain from the housing 20. When the pressure in the pipe 17 is relieved, as above-mentioned, the diaphragm 60 will of course be restored to its inactive position shown in Fig. 2, thereby again closing the passage 45 at the shoulder 47, in an obvious manner. Since the alternate cutting in and cutting out of the compressor occurs with great frequency in an operating vehicle, it is apparent that the draining operation above described will occur at very frequent intervals and thereby prevent the accumulation of a detrimental amount of sludge in the reservoirs.

Obviously, modifications in form and structure may be made without departing from the spirit or scope of the invention.

We claim:

1. In a compressed air system including a compressor and an air reservoir, said compressor having an output outlet, an upright housing having an outlet through the top thereof and having an inlet positioned intermediate the height of the housing, a line connecting said housing outlet with said reservoir, a line connecting said compressor with said housing inlet, a check valve positioned in said first-named line above and closely adjacent said top of said housing, said housing having a drain valve mounted in the bottom thereof, said drain valve having normally expanded resilient means for normally closing said drain valve, means for compressing said resilient means for opening said drain valve, and a filter surrounding said housing outlet to prevent sludge from passing with fluid between said housing inlet and said housing outlet said sludge thereby settling to the bottom of said housing, said check valve upon opening of said drain valve preventing discharge of fluid from said reservoir through said first-named line and said housing into the atmosphere.

2. The improvement set forth in claim 1, said drain valve comprising a nipple mounted on the bottom of said housing and having a horizontal passage therethrough, said housing having a vertical opening through the bottom thereof communicating with said horizontal passage of said nipple, said horizontal passage having a shoulder therein intermediate its length and spaced from said vertical opening, a valve member of greater cross-sectional area than that of the opening through said shoulder slidably mounted in said horizontal passage on one side of said shoulder, said resilient means normally urging said member against said side of said shoulder, a stem slidably mounted in said horizontal passage on the other side of said shoulder and of lesser diameter than said horizontal passage and said shoulder and having one end thereof in loose contact with said member, said horizontal passage having a drain vent on said other side of said shoulder, said stem having the other end thereof extending out of said nipple and having a diaphragm thereon, a housing enclosing said diaphragm in a chamber, said last-named housing having an inlet opening thereinto, said branch line being connected to said last-named opening.

3. The improvement set forth in claim 1, said housing having a boss projecting downward from said top thereof, said housing outlet comprising a vertical passage through said boss, a vertical rod having its upper end registering in said vertical passage, said rod extending downward into said housing and having an axial passage extending downward from the upper end thereof to a point intermediate the height of the rod thereby providing said rod with a pipe-like upper portion, said upper portion of said rod having a plurality of radial passages therethrough, said filter comprising a cup-shaped screen having an axial passage through the bottom thereof, the rim of said screen engaging said boss, said rod passing through said axial passage of said screen, said axial passage in said rod terminating between said bottom of said screen and said rim of said screen, the space between said upper portion of said rod and said screen being filled with a filtering material.

4. Means adapted to be interposed in a compressed air line for filtering the air and for disposing of the sludge filtered from the air, comprising an upright housing having an air outlet in the roof thereof and a check valve in said outlet, said housing having an air inlet therein intermediate the height thereof, said housing having a filter surrounding said outlet and positioned at a distance above the bottom of the housing to prevent sludge from passing from said inlet through said outlet, said sludge thereby falling to the bottom of the housing, said bottom of the housing having a drain valve therein, resilient means normally closing said drain valve, and means for intermittently opening said drain valve.

5. The air filtering and sludge disposing means set forth in claim 4, said housing having a boss surrounding said air outlet, a vertical rod having the upper end thereof registering in said air outlet, the upper portion of said rod being hollow and having a plurality of circumferentially and longitudinally spaced radial openings therethrough, said filter comprising a cup-shaped screen having the rim thereof engaging the rim of said boss and having an axial opening through the bottom thereof, said rod passing through said screen opening, the lowermost of said radial openings being positioned above the bottom of said screen, the space between said screen and said upper portion of said rod having a filtering material occupying the same.

OTIS R. SHERMAN.
SAMUEL JACOVELLI.

REFERENCES CITED

The following references are of record in the file of this patent:

UNITED STATES PATENTS

| Number | Name | Date |
|---|---|---|
| 2,192,769 | Dach | Mar. 5, 1940 |
| 2,256,565 | Mantle | Sept. 23, 1941 |
| 2,301,034 | Freeman et al. | Nov. 3, 1942 |
| 2,330,040 | Fitch | Sept. 21, 1943 |